United States Patent [19]
Unland et al.

[11] Patent Number: 5,743,233
[45] Date of Patent: Apr. 28, 1998

[54] METHOD FOR DETECTING KNOCKING

[75] Inventors: Stefan Unland; Oskar Torno, both of Schwieberdingen; Stefan Bollig, Markgroeningen; Werner Haeming, Neudenau, all of Germany; Ulrich Rothhaar, Milan, Italy; Iwan Surjadi, Vaihingen, Germany; Wolfgang Hilbert, Moeglingen, Germany; Robert Sloboda, Markgroeningen, Germany; Michael Baeuerle, Besigheim, Germany; Thomas Edelmann, Bietigheim-Bissingen, Germany

[73] Assignee: Robert Bosch GmbH, Stuttgart, Germany

[21] Appl. No.: 617,834

[22] Filed: Apr. 1, 1996

[30] Foreign Application Priority Data

Oct. 5, 1993 [DE] Germany ............... 43 33 965.4

[51] Int. Cl.[6] ............... G01M 15/00; G01D 1/18; G01L 23/22; G01H 1/00
[52] U.S. Cl. ............... 123/425; 73/35.05
[58] Field of Search ............... 123/425, 435; 73/35.05, 35.06

[56] References Cited

U.S. PATENT DOCUMENTS

| | | | |
|---|---|---|---|
| 4,391,126 | 7/1983 | Van Zanten | 73/35.05 |
| 4,593,553 | 6/1986 | Bonitz et al. | 73/35.05 |
| 4,699,106 | 10/1987 | Haraguchi et al. | 123/425 |
| 5,115,778 | 5/1992 | Holroyd | 123/425 |
| 5,140,962 | 8/1992 | Iwata | 123/425 |
| 5,144,929 | 9/1992 | Hosoya et al. | 123/425 |
| 5,460,031 | 10/1995 | Fujishita et al. | 123/425 |

FOREIGN PATENT DOCUMENTS

| | | |
|---|---|---|
| 458993 | 12/1991 | European Pat. Off. . |
| 31 37 016 | 3/1983 | Germany . |
| 4128577 | 3/1992 | Germany . |
| 135435 | 8/1983 | Japan . |
| 207877 | 9/1986 | Japan . |
| 2265006 | 9/1993 | United Kingdom . |

*Primary Examiner*—Willis R. Wolfe
*Attorney, Agent, or Firm*—Kenyon & Kenyon

[57] ABSTRACT

A method for detecting knocking provides for weighting or limitation of the knocking threshold. For this purpose, on the one hand a normal range of the reference level is defined and in the case of a deviation from this normal range the knocking threshold is multiplied by a weighting factor less than 1 and, alternatively, the knocking threshold is limited when a prescribable limit value is reached.

10 Claims, 4 Drawing Sheets

METHOD FOR DETECTING KNOCKING

BACKGROUND INFORMATION

A method for detecting knocking is described in German Patent Application No. 31 37 016. In this method for detecting knocking of an internal combustion engine at least one knocking sensor is used. This knocking sensor senses the noise level for each cylinder over a specific crankshaft angle. The knocking sensor signal sensed in this way is integrated lo over this crankshaft range. A cylinder identification is carried out for the assignment of the sensed engine noises to the individual cylinders. The sensed knocking sensor signals are integrated in a time window and the integral value is compared with a knocking threshold in order to detect knocking. Here, the knocking threshold for the detection of knocking is not strictly prescribed but rather separately renewed with each combustion. The specification of the knocking threshold takes place in that the previous knocking threshold is supplied with the present knocking sensor signal so that the knocking threshold is adapted to the generation of noise by the engine, in particular as aging occurs. Knocking is detected if the integral exceeds the knocking threshold over the time window in which the sensor signals are evaluated.

After knocking is detected, the basic ignition angle determined over a rotational speed/load characteristic diagram is changed by a specific amount which is determined by the control unit as a function of the detected knocking and on the basis of the operating parameters. The change in the background noises, and thus the knocking threshold, can lead, for example as a result of aging over the service life of the engine, to the integrator value at some point no longer reaching the continuously newly calculated knocking threshold, even when strong knocking occurs. If the noise of the engine, or of a cylinder, becomes louder and louder, for example as a result of mechanical damage or aging, under certain circumstances even strong knocking cannot be detected.

SUMMARY OF THE INVENTION

The method according to the present invention has the advantage that it is ensured that knocking is detected even when the engine becomes louder and thus the knocking threshold rises.

In such a case, multiplication by a weighting factor permits the knocking threshold to be reduced. Multiplication by a weighting factor WF<1 provides the advantage that, in the event of engine noise which lies outside a prescribable normal range NB, the continuously adjusted knocking threshold does not become too large and thus knocking can still be detected even in the case of a very loud engine.

The method according to the present invention has the advantage of limiting the knocking threshold for the detection of knocking so that, even in the case of engine noises which are becoming louder, at least relatively strong knocking can still be detected. If the engine noise continues to rise and then exceeds an even higher second threshold, the knocking control is switched off completely and a safety late-adjustment ignition angle is output. This safety late-adjustment ignition angle thus secures very largely knock-free operation of the internal combustion engine.

It is particularly advantageous that a normal range can be specified for each engine operating point and thus an appropriate weighting factor can be output both in the case of a low rotational speed and small load and in the case of a high rotational speed and high load. Finally, further advantage is obtained by the cylinder-specific specification of the normal range.

The specification of the normal range NB can be advantageously specified for each type of engine as a function of the installation location of the knocking sensor in the application. Thus, each type of engine has its values which are tailored to it individually, and thus permits optimum knocking control.

DETAILED DESCRIPTION

Figure 1:
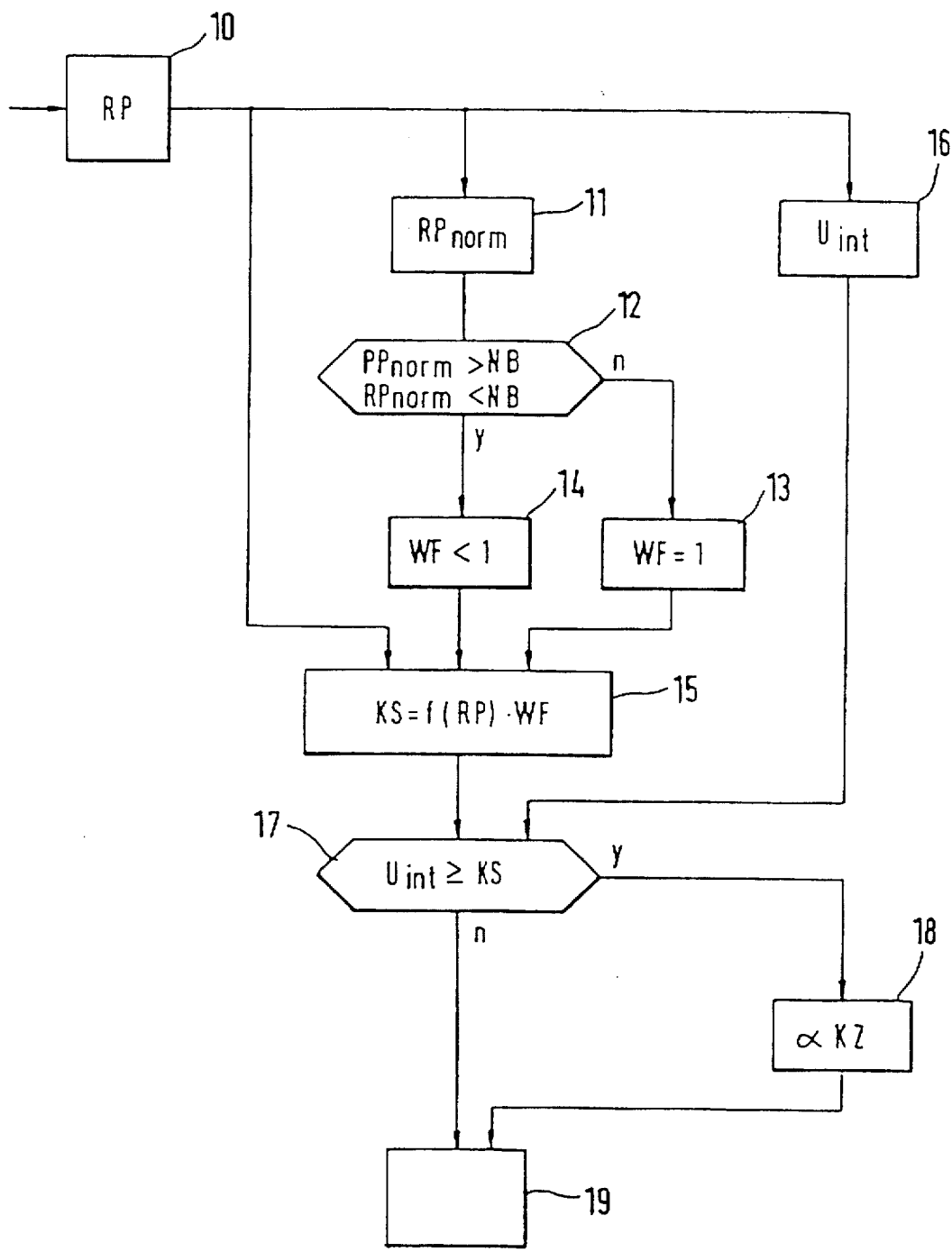
FIG. 1 shows a block circuit diagram for the detection of knocking, according to the present invention.

FIG. 1 shows schematically the block circuit diagram for knocking control with a weighting of the Knocking threshold KS above which knocking is detected. The knocking sensor (not illustrated) senses the noise level in the cylinders for each cylinder over a prescribed crankshaft angle. The knocking threshold KS, above which knocking is detected, is not strictly prescribed but rather cyclically renewed with each combustion. The specification of the knocking threshold KS takes place in that the previous knocking threshold is provided with the present reference level RP. The reference level RP forms the input variable 10 for the detection of knocking. The standardized reference level RPnorm is determined from the reference level RP in a step 11 for an objective comparison of the individual reference levels RP in that the reference level RP is divided by the cylinder-specific amplification factor. This is necessary since, in order to be able to process all knocking sensor signals correctly in an evaluation circuit, the signals supplied by the knocking sensor are amplified in such a way that in the case of large signals the amplification is small and in the case of small signals the amplification is large. The result of this is that the output signal of the amplifier which is assigned downstream of the knocking sensor and also not illustrated is approximately constant over the entire rotational speed range. In a subsequent interrogation 12 it is investigated whether the standardized reference level RPnorm, which can also be present on a cylinder specific basis, lies in a normal range NB which can be specified. The normal range NB is specified for example in the application for the engine type. Here, it is investigated on the one hand whether the standardized reference level RPnorm exceeds the normal range NB or drops below it. A negative response to this interrogation 12, i.e. the standardized reference level lies within the normal range NB, leads to the operational step 13 and the outputting of a weighting factor WF with the value 1. A positive response to the interrogation 12, i.e. the standardized reference level RPnorm does not lie in the prescribable normal range NB, leads to the operational step 14 and the outputting of a weighting factor WF of less than 1, thus when the normal range NB is exceeded for example the following values are possible as weighting factors: $WF_1=0.9$, $WF_2=0.8$, $WF_3=0.65$. These weighting factors WF can be specified differently for different engine operating points, the adaptation to the associated thresholds for the normal range of the standardized reference level being carried out, as far as possible, on a plurality of engines which have a normal noise behavior over the entire rotational speed range. In order to determine the normal range NB, knocking sensors with maximum sensitivity should be mounted on these engines in order to determine the standardized reference level of all the cylinders at the desired rotational speed sampling points on the characteristic curve. In operational step 15, the knocking threshold KS is determined from the reference level RP and the weighting factor WF. The knocking threshold KS constitutes the threshold above which knocking is detected. Parallel thereto, in a working step 16 the knocking interval $U_{int}$ is determined for each cylinder. In an interrogation 17 the knocking interval $U_{int}$ is compared with the knocking threshold KS. If the integral value $U_{int}$ is greater than the knocking threshold KS, knocking is detected and the positive response output to this interrogation 17 leads to a working step 18 in which a correction ignition angle $\alpha_{KZ}$ is output. This correction ignition angle is adaptively added for example to the characteristic diagram ignition angle. In the following operational step 19, the system jumps back and the evaluation is performed for the next combustion.

Figure 2:
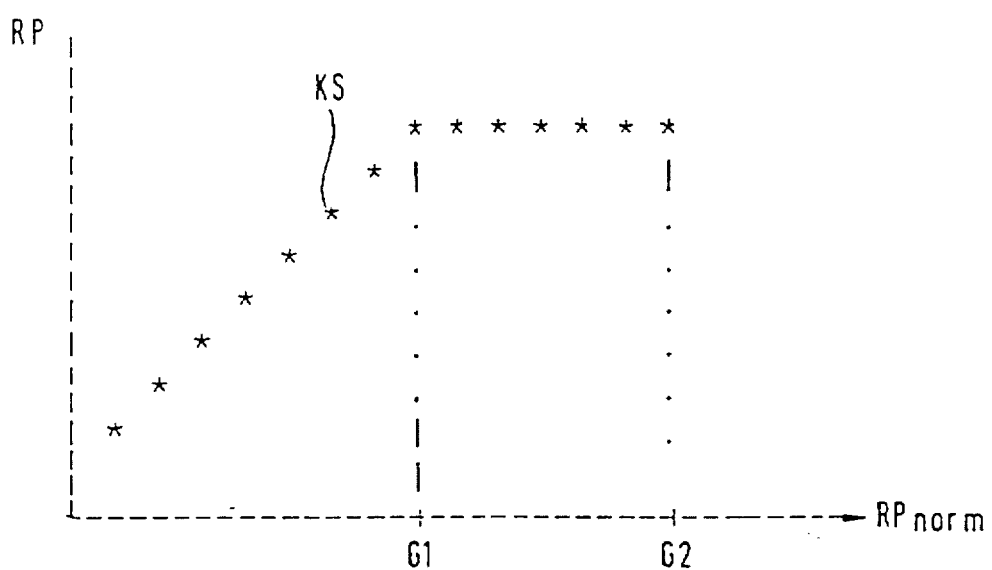
FIG. 2 shows the limitation of the reference level by switching off the knocking control, according to the present invention.

FIG. 2 shows an alternative solution to the same problem, a limitation of the adjusted knocking threshold being performed, as will be described below. In FIG. 2, details will be given here with reference to a diagram on how the knocking threshold KS changes as the engine noise increases, that is to say as the reference level RP rises. The knocking threshold KS accordingly rises until the standardized RP reaches the first limit value G1, starting from which the knocking threshold is limited.

Thus, it is possible to detect knocking even in the case of strongly rising engine noise, since it is ensured that the knocking threshold is limited and thus at least strong knocking is detected. In the diagram, a second limit value variable G2 is defined, starting from which limit value variable G2 the knocking control can be entirely switched off and a safety late-adjustment ignition angle is output by the control unit. A graduated procedure for protecting the engine is possible as a result of this method.

Figure 3:
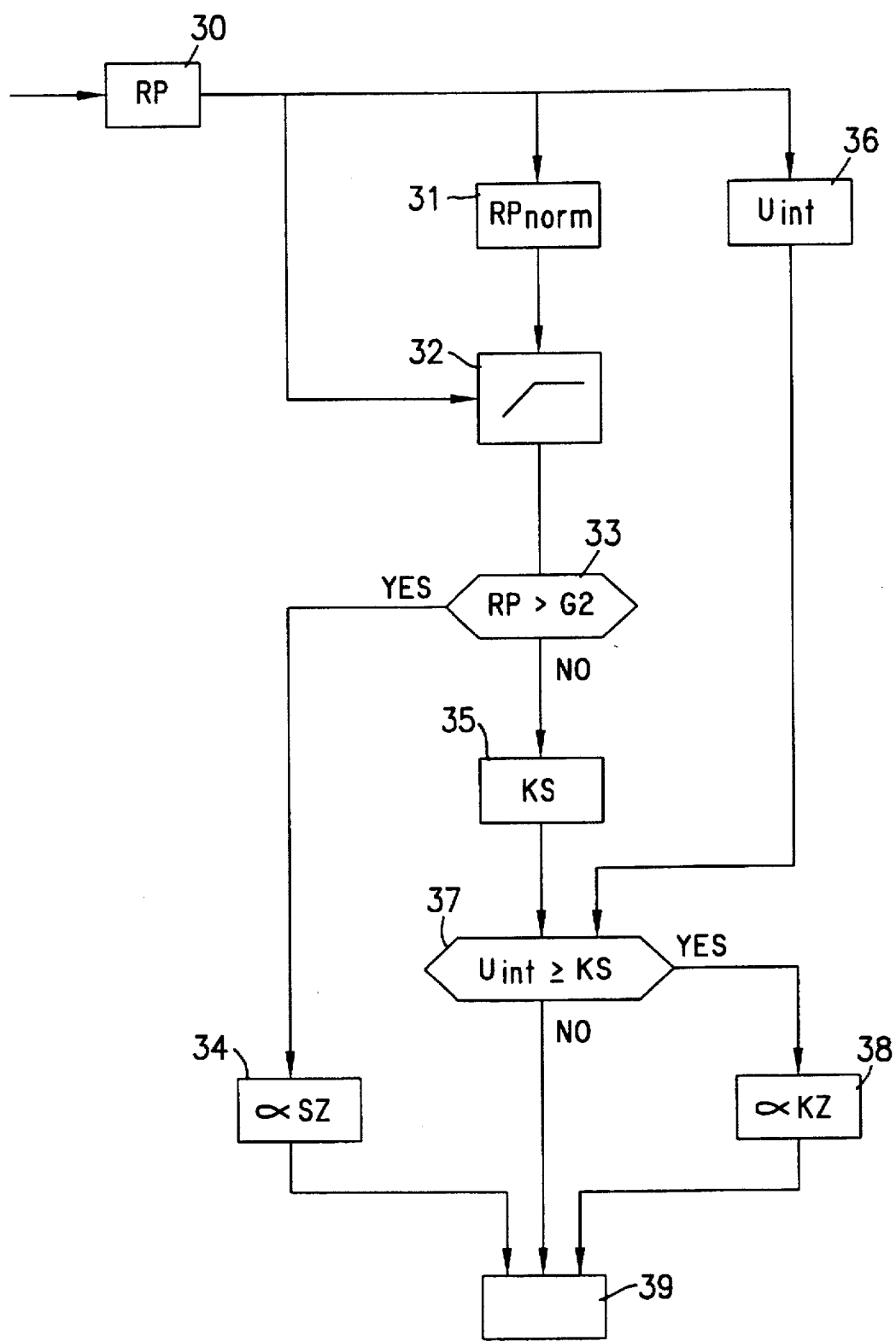
FIG. 3 shows a block circuit diagram for carrying out the limitation of the knocking threshold according to the present invention.

FIG. 3 shows a sequence plan for the execution of an alternative method, as has already been explained with reference to FIG. 2. A knocking sensor (not illustrated) senses the engine noises, and the reference level RP is formed in a first operational step 30. This reference level RP is, as already explained, renewed cyclically after each combustion. In an operational step 31, the standardized reference level is now determined in turn for each cylinder. This standardized reference level RPnorm and the reference level RP form the values on the abscissa or ordinate of the diagram according to FIG. 2. In the operational step 32, these values are evaluated and, when a first limit value G1 is reached, the reference value is limited to the value. In the following interrogation 33 it is tested whether the standardized reference level, which is not limited, has reached a second limit value G2. If this is the case, the positive response output leads to a working step 34, the knocking control is switched off, and at the same time a safety late-adjustment ignition angle $\alpha_{SZ}$ is output.

If the response to the interrogation 33 has been negative, the reference value for the detection of knocking is determined in an operational step 35. Parallel thereto, the knocking sensor integral $U_{int}$ is formed in an operational step 36. In the interrogation 37 it is now investigated whether the measurement integral $U_{int}$ reaches, or exceeds, the knocking threshold KS. If this is the case, knocking is detected and a correction ignition angle $\alpha_{KZ}$ is output in an operational step 38. Subsequently, in an operational step 39 the system jumps back to the start of the sequence plan and the next sensed reference level is processed.

The limitation of the knocking threshold can also take place here in a cylinder-specific way.

Figure 4:
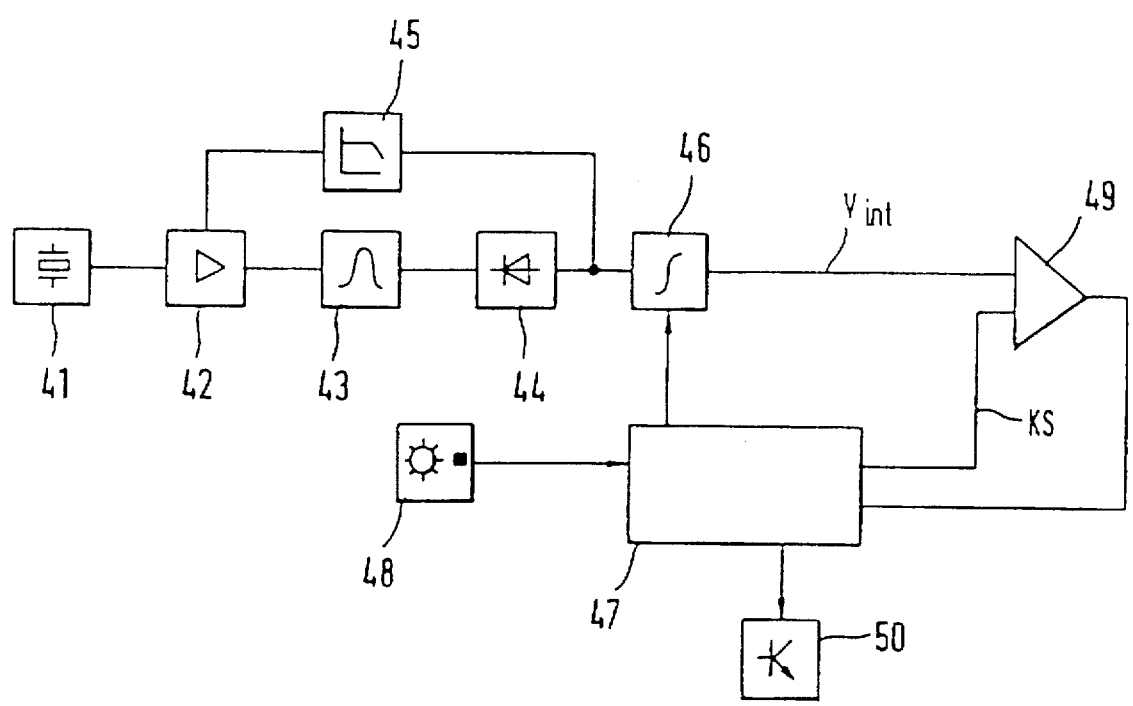
FIG. 4 shows a refinement, in terms of circuitry, for carrying out knocking control according to the present invention.

FIG. 4 shows an example of a circuit for controlling knocking, a knocking sensor 41 sensing the engine noises of an internal combustion engine (not illustrated). The sensed engine noises are fed via a controllable amplifier 42 and a bandpass filter 43 to a demodulator circuit designed as a rectifier 44. The rectifier 44 is connected on the one hand via a controller 45 to the controllable amplifier 42 and on the other hand to an integrator 46. By controlling the amplification the reference level of the output signal of the controllable amplifier 42 is kept largely constant and independent of the engine speed while the signal amplitude of the knocking sensor 41 increases with the engine speed. The integrator 46 forms the measurement integral $U_{int}$ during a crankshaft-synchronous measurement window which is formed by a control unit 47 as a function of a rotational speed sensor 48. This measurement integral $U_{int}$ is compared in a comparator 49 with the knocking thresholds KS prescribed by the control unit 47 and an output signal of the comparator 49 is in turn fed to the control unit 47 in order to control knocking. An output signal is transmitted by the control unit 47 to an output stage 50 in order to trigger the ignition in the respective cylinder.

What is claimed is:

1. A method of detecting knocking of an internal combustion engine, comprising the steps of:
   specifying a normal range of engine noise for a plurality of operating points of the engine;
   determining when an engine noise deviates from the normal range of engine noise;
   multiplying a knocking threshold by a weighting factor not equal to 1 when the engine noise deviates from the normal range of engine noise;
   sensing a knocking signal; and
   detecting knocking when the sensed knocking signal exceeds the knocking threshold.

2. The method according to claim 1, further comprising the step of cyclically renewing the knocking threshold after each combustion of the engine.

3. The method according to claim 1, wherein the specifying step includes the step of calculating the normal range as a function of a standardized normal reference level.

4. The method according to claim 1, wherein the normal range is specified in a cylinder-specific manner.

5. The method according to claim 1, wherein the weighting factor is less than 1 if a standardized reference level is above the normal range.

6. The method according to claim 1, wherein the weighting factor is greater than 1 if a standardized reference level is below the normal range.

7. The method according to claim 1, wherein the weighting factor is a function of an engine type.

8. The method according to claim 1, wherein the weighting factor is a function of an engine operating point.

9. A method for detecting knocking of an internal combustion engine, comprising the steps of:
   specifying a normal range of engine noise for a plurality of operating points of the engine;

determining when an engine noise deviates from the normal range of engine noise;

multiplying a knocking threshold by a weighting factor not equal to 1 when the engine noise deviates from the normal range of engine noise;

limiting the knocking threshold to a first limit value;

sensing a knocking signal; and detecting knocking when the sensed knocking signal exceeds the knocking threshold.

10. The method according to claim 9, further comprising the steps of, when the knocking threshold exceeds a second limit value, switching off a knocking control and outputting a safety late-adjustment ignition angle.

* * * * *